Sept. 29, 1953 C. C. KINKER ET AL Re. 23,715

BURNISHING MACHINE AND METHOD

Original Filed Jan. 25, 1950 3 Sheets-Sheet 1

INVENTOR.
Clarence C. Kinker
BY James J. Murtagh
Owen & Owen,
ATTORNEYS

BURNISHING MACHINE AND METHOD

Original Filed Jan. 25, 1950 3 Sheets-Sheet 2

INVENTOR.
Clarence C. Kinker
BY James J. Murtagh
ATTORNEYS

BURNISHING MACHINE AND METHOD

Original Filed Jan. 25, 1950 3 Sheets-Sheet 3

INVENTOR.
Clarence C. Kinker
BY James J. Murtagh
Owen & Owen
ATTORNEYS

Reissued Sept. 29, 1953 Re. 23,715

UNITED STATES PATENT OFFICE 23,715

BURNISHING MACHINE AND METHOD

Clarence C. Kinker, Manitou Beach, Mich., and James J. Murtagh, Toledo, Ohio, assignors to Gerity-Michigan Corporation, Adrian, Mich., a corporation of Michigan Original No. 2,608,803, dated September 2, 1952, Serial No. 140,528, January 25, 1950. Application for reissue April 15, 1953, Serial No. 349,114

18 Claims. (Cl. 51—134)

Matter enclosed in heavy brackets [ ] appears in the original patent but forms no part of this reissue specification; matter printed in italics indicates the additions made by reissue.

This invention relates to *a method of and* means for buffing and burnishing metal articles in preparation for the application of protective coatings thereto such as platings.

The buffing, burnishing and polishing of metals in preparation for the application of protective coatings, as for instance electro-plating, has always, so far as we are aware, been a slow, laborious, hazardous and expensive process. The use of fabrics, skins, leather and applied abrasives, in a rotary polishing wheel, is very costly and each article requires special buffs.

Useful life of the buff is impaired by wear which increases with the complicated nature of the contour or surface acted on. This is especially true where sharp edges are encountered and the abrading material of the wheel is rapidly torn into shreds by working against such edges or other rough surfaces. In such cases, an exhaust system is required to remove and dispose of the residue from the wheel with a considerable expenditure of both power and labor.

Furthermore, the abrasives applied to the abrading wheel are rapidly dissipated and lost by centrifugal action, thus creating a messy residue the removal of which applies an additional load on the exhaust. In addition, considerable effort and expense are entailed in the removal from the crevices of the treated articles of the abradant remaining thereon after the abrading operation.

The primary object of this invention is to obviate the objections above-noted by the provision of simple and efficient means for buffing and burnishing metal articles while submerged in or wet with a burnishing solution and at a considerable saving in time, labor and material used over the means heretofore used for the purpose.

Another object of the invention is to improve the abrading means heretofore employed by reducing to a minimum the dissipation of abrasive material.

Another object of the invention is the provision, in a machine of the class described, of an improved form and construction of rotary abrading element whereby abrading of an article may be accomplished in a rapid, efficient and economical manner.

*Another object of the invention is to provide an improved method of burnishing the surface of formed metal articles in the presence of a liquid-suspended abrasive.*

Figure 1:
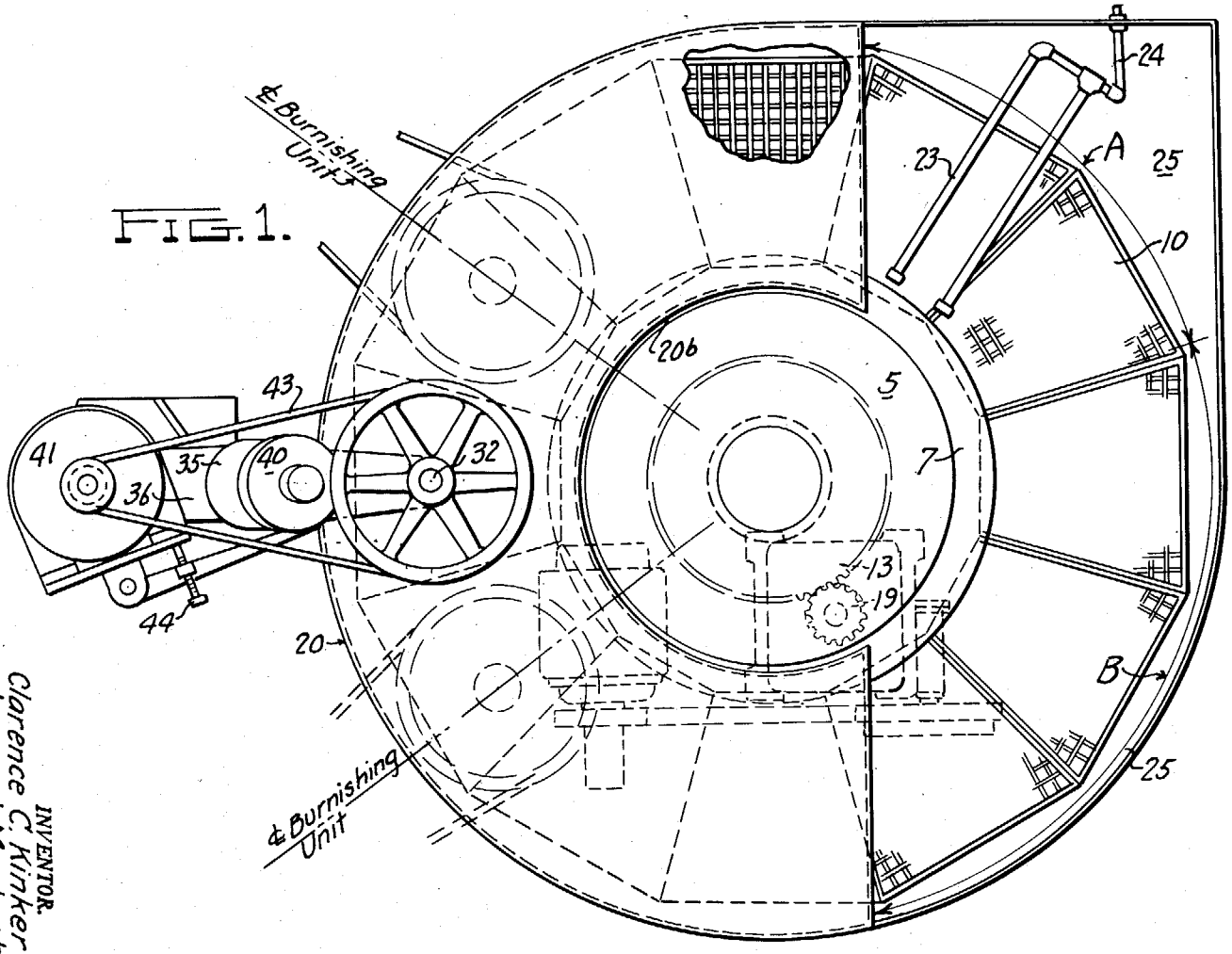
Figure 2:
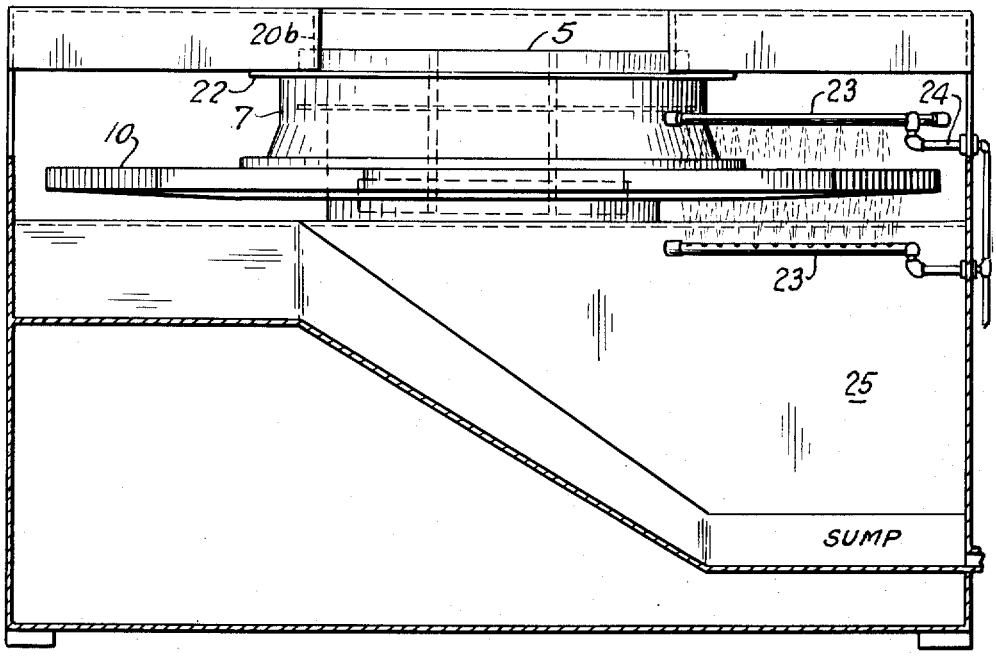
Figures 3, 4, 5:
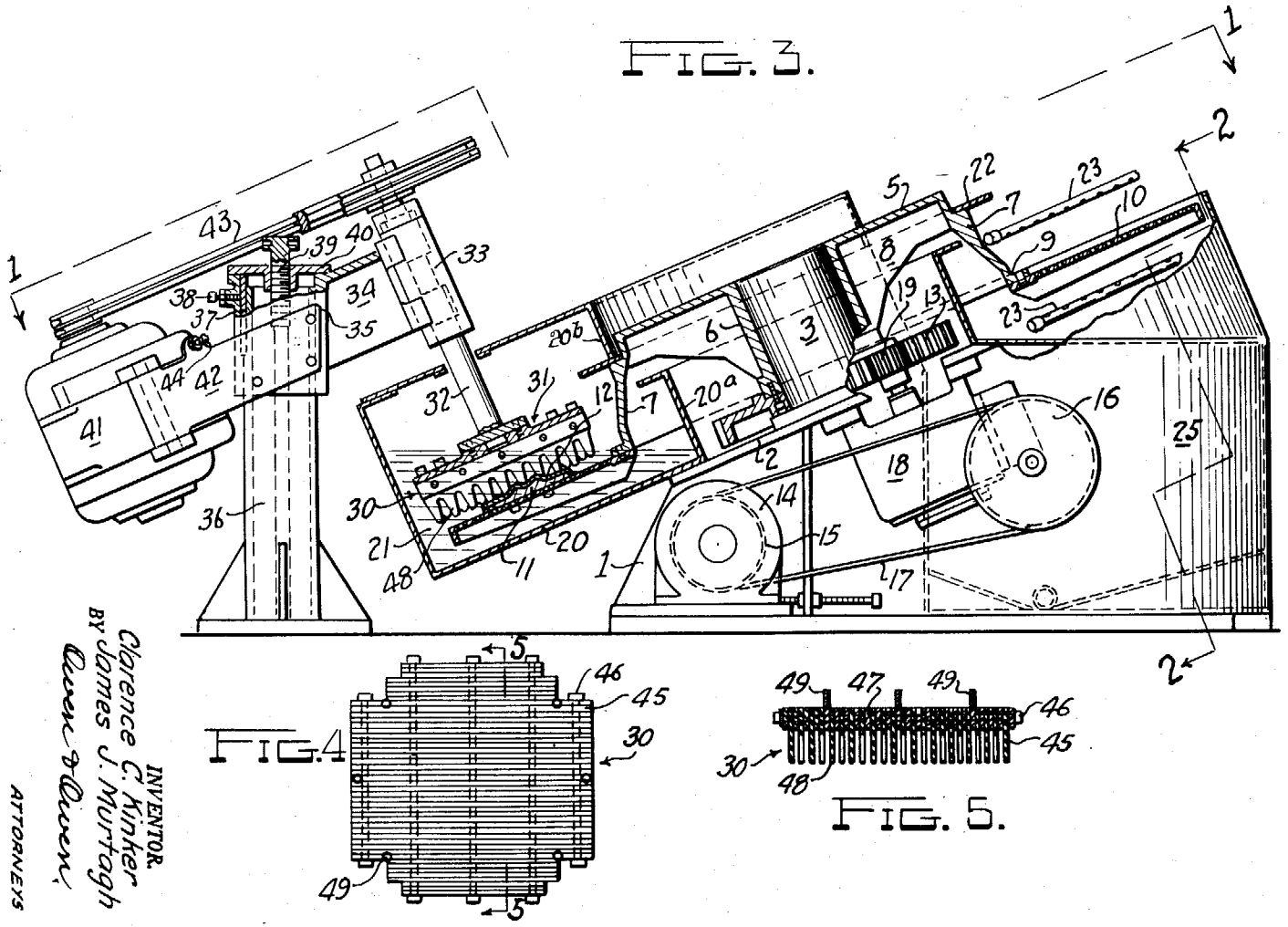

Further objects and advantages of the invention will be apparent from the following detailed description and from the accompanying drawings illustrating one embodiment thereof, in which Fig. 1 is a plan view of an apparatus embodying the invention with a part broken away; Fig. 2 is a [rear end view of the apparatus with parts broken away;] *section on line 2—2 of Fig. 3*; Fig. 3 is a side elevation of the apparatus with parts broken away; Fig. 4 is a top plan view of the rotary buffing mat of the machine, and Fig. 5 a section thereof on the line 5—5 in Fig. 4.

Referring to the drawings, 1 designates the base frame of the machine, the top 2 of which is inclined to the horizontal and provided with an upstanding journal stud 3 with its axis normal to the plane of inclination of said top. A turntable 5 is mounted for rotation about the axis of the stud 3 and has a depending hub sleeve 6 journaled on the stud. The table 5 is formed by annularly flanging the sleeve at its upper end, and the outer edge of such flange is provided with a skirt flange 7 that is braced with respect to the sleeve by radial webs 8. The flange 7 terminates at its lower edge in an annular outturned flange 9 to which the inner edge of an annular work-carrying rim portion 10 is attached. This rim presents a broad article-supporting surface disposed in a plane normal to the hub axis, and it is perforated or of foraminous form to permit liquids to pass freely therethrough. In practice, it is preferable to make the rim 10 in sections, as shown, to facilitate building and to permit damaged parts to be easily and quickly removed for repair or replacement.

A series of work-carrying fixtures 11 may be fixedly mounted on the rim 10 for movement therewith, or the work-pieces 12 to be burnished may be secured in some other suitable manner directly to the rim.

The hub sleeve 6 is provided at its lower end with a large ring gear 13 that is driven at slow speed from a motor 14 through suitable reduction gearing. In the present instance, the motor pulley 15 has driving connection with a pulley 16 through a belt 17 and this last pulley has driving connection through suitable speed reduction gearing in the case 18 with a small pinion 19 in mesh with the ring gear 13.

A substantially U-form of tank 20 for holding a burnishing liquid 21 extends around the front or lower side of the table 5, and for a distance rearwardly at each side thereof, in the inclined plane of rotation of the work supporting rim 10 of the table. The bottom of this tank extends slightly below the table rim 10, so that the rim and work, as they pass through the lower forward loop portion of the tank, are submerged in the burnishing liquid 21 therein. The rear or terminal ends of the leg portions of the tank 20 are open to permit the movement of the table rim therethrough and the level of the liquid in the front loop portion of the tank is below the upper rear end edges of the leg portions of the tank bottom. The inner wall 20a of the tank extends up within the skirt 7 of the table 5 entirely around the hub sleeve 6 and is preferably inwardly flanged at its top edge, as shown. The top of the tank is preferably closed and provided at its inner end with a depending flange or inner side wall part 20b that terminates in adjacent relation to an annular splash flange 22 mounted on and projecting outwardly from a ledge on the table skirt 7 into the tank 20.

The table 5 turns in clockwise direction and its rim 10, after leaving the outlet end of the tank 20, passes through a washing zone A and then through a work removal and loading zone B. In the washing zone, a cleaning water or other suitable fluid is sprayed against the top and bottom of the rim 10 and the work thereon from perforated pipes 23 which have communication through a pipe 24 with a suitable source, preferably under pressure. The resultant drainage liquid enters the open top of a sump 25 located beneath the rim portion of the turntable in the rear of the frame 1.

At least one rotary buffing or polishing mat 30 is located within the lower front portion of the tank 20 and is at least partially submerged in the burnishing liquid 21 therein. The mat 30 is disposed in the path of the top surfaces of the work-pieces 12 as they pass around with the table 10. The frictional burnishing action of the mat combines with the cleaning and burnishing action of the chemical 21 to impart an efficient polish to all surfaces of the work exposed to the mat.

The mat 30 is detachably carried by a rotary head or disk 31 which in turn is mounted centrally on the lower end of a shaft 32 that projects down into the tank from a bearing head 33. This head is carried at the outer end of an arm 34 that has a sleeve 35 at its inner end mounted for vertical adjustment on the upper end a standard 36. A feather 37 prevents the sleeve from turning on the standard and a set-screw 38 holds the sleeve in adjusted position. Adjustment of the sleeve is effected by the turning of a jack-screw 39 that is mounted in the standard and is threaded through a cover 40 fixedly mounted on the upper end of the sleeve.

A motor 41 is carried by an arm 42 projecting forwardly from the sleeve 35 in opposition to the arm 34, and a belt and pulley driving connection 43 is provided between the motor shaft and mat shaft 32. The motor 41 is shown as pivotally carried by its arm 42 to permit adjustment of the driving belt tension, and such adjustment is effected by a screw 44 on the arm. The axes of the mat shaft 32 and the motor 41 are preferably parallel to the turning axis of the work-carrying table 5. If desired, more than one mat and its mounting and driving unit may be employed, as indicated in dotted lines in Fig. 1, so that the work-pieces as they revolve with the table may be successively acted on by different mats, turning in the same or different directions.

While mats of various forms and construction may be used, a novel and efficient form for the purpose is shown in Figs. 3, 4 and 5 and includes a plurality of flexible strips 45 of a suitable abrasive resistant material, preferably rubber, because it can be readily molded and used in varying thicknesses. These strips are clamped together at their inner edges by cross-rods or bolts 46 together with shallow inner edge spacing strips 47, so that the outer free edge portions of the buffing strips 45 are transversely spaced from each other for free relative flexing movements. These free edges of the buffing strips are notched to provide each with a plurality of fingers 48 spaced lengthwise thereof and preferably alternating in position with the fingers and notches of the immediately adjoining strips. Some of the spacers 47, which may be of metal, have threaded studs 49 projecting upward therefrom for insertion through openings in the mat head 31 and to receive nuts for fastening the mat to the head. Different mat structures may be made by varying the thickness of the abrading and spacer strips and by increasing or diminishing the number and lengths and the stiffness of the abrading strips to give a coarse, medium or finely finished surface to the polished article.

In operation, the articles to be buffed and burnished are successively secured to the rear elevated portion of the table rim 10 as it passes through the receiving zone B and these, as the table turns, pass downward and forward through the burnishing chemical 21 in the lower portion of the tank 20 and under the rotary buffing mat or mats 30 in buffing engagement therewith. The turning of a mat head in engagement with the top exposed surfaces of the workpieces, while submerged in the burnishing solution 21 or wetted thereby, effects a thorough, rapid economical and efficient burnishing of the work without danger to the workman and without personal handling of the work. As the work advances with the slow movement of the table, it leaves the burnishing solution 21 and is quite thoroughly drained of such solution before leaving the tank 20 and passing through the washing zone A. After washing, the burnished article may be removed from the table rim 10 in the zone B and another article to be burnished substituted therefor.

It is found in practice that this machine effects a thorough and efficient burnishing of articles placed on the table rim 10; that such burnishing is accomplished much more rapidly than if the same parts are burnished by hand; that the expense involved in operating the machine is very much less than the expense involved, both in labor and materials, in hand buffing; that the expensive exhaust system that is necessarily a part of a hand buffing operation can be eliminated, and that other advantages and savings are made.

We wish it understood that our invention is not limited to any specific construction, arrangement or form of the parts, as it is capable of numerous modifications and changes without departing from the spirit of the claims.

Having thus described our invention, what we claim as new, and desire to secure by United States Letters Patent, is:

1. An article burnishing machine having a tank with its bottom inclined to a horizontal and adapted to hold a burnishing liquid in the lower side portion thereof, and to drain liquid to said lower side portion from elevated portions of the tank bottom, a burnishing liquid in said tank, an endless article-carrying means movable through the tank and liquid therein on an incline substantially corresponding to that of the tank, and means *comprising a tool having a plurality of separated elongated flexible rubber rubbing elements* operable to coact with and buff an article carried by said first means when the article is in said liquid.

2. An article burnishing machine having a tank for holding a burnishing liquid, a burnishing liquid in said tank, a rotatable table having an article-carrying rim portion, said table and its rim being rotatable in a plane inclined to a horizontal with the lower article-carrying portion thereof submerged in the burnishing liquid and with the rim depending into the tank from the table, means for rotating the table, and means *comprising a tool having a plurality of separated elongated flexible rubber rubbing elements* for buffing the carried articles when in the tank liquid.

3. In an article burnishing machine, a tank U-shaped in plan for containing a burnishing liquid, a burnishing liquid in said tank, the tank having its bottom on an incline to a horizontal with its loop portion lowermost to hold the liquid therein and with openings in the ends of its leg portions which are elevated, article-carrying means movable on an incline into and out of the tank through its end openings and through the lower loop portion thereof and the liquid in said lower loop portion, means for moving said first means, and means operable to buff articles carried by said first means when in the lower liquid-holding portion of the tank.

4. In an article burnishing machine, a tank for holding a burnishing liquid, a burnishing liquid in said tank, a rotary member having an article-carrying rim portion rotatable in an inclined plane to move articles successively from an elevated article-removing-and-receiving zone to a lower zone in the tank and into the liquid therein and then back to said first zone, and means *comprising a tool having a plurality of separated elongated flexible rubber rubbing elements* for buffing the carried articles while in said lower zone.

5. In an article burnishing machine, a tank for containing a burnishing liquid, a burnishing liquid in said tank, a rotary member having an annular foraminous rim portion for carrying articles to be burnished and movable in a plane inclined to a horizontal with its lower arc of movement through the liquid in the tank, and means *comprising a tool having a plurality of separated elongated flexible rubber rubbing elements* projecting into the tank for buffing the carried articles when wet with the tank liquid.

6. In an article burnishing machine, an inclined bearing, a tank U-form in plan and transversely straddling said bearing with its bottom plane disposed on an incline substantially normal to the bearing axis, the loop portion of the tank being lower than its leg ends, a burnishing liquid in said lower tank portion, means rotatable on said bearing in substantially the inclined plane of the tank and having an article-carrying rim portion movable through the tank liquid, means for rotating said means, and means operable to buff articles carried by said first means when in the liquid-holding portion of the tank.

7. In an article abrading machine, a tank U-shaped in plan having its bottom inclined to a horizontal with its loop portion lowermost and with its leg ends open, a bearing disposed between the legs of the tank and having its axis substantially normal to the plane of incline of the tank bottom, a member mounted on said bearing and having an annular rim portion rotatable through said tank in substantially the plane of incline of its bottom and adapted to carry articles to be abraded and for passage through the tank and through the open ends of its leg portions, means for wetting the articles as they pass through the lower loop portion of the tank, and means for abrading the articles when in the loop portion of the tank.

8. In an article abrading machine, a tank U-shaped in plan having its bottom inclined to a horizontal with its loop portion lowermost and with its leg ends open, a bearing disposed between the legs of the tank and having its axis substantially normal to the plane of incline of the tank bottom, a member mounted on said bearing and having an annular rim portion rotatable through said tank in substantially the plane of incline of its bottom and adapted to carry articles to be abraded and for passage through the tank and through the open ends of its leg portions, means for wetting the articles as they pass through the lower loop portion of the tank, a rotatable abrading head projected into the loop portion of the tank for engagement with a registering article on said member rim, the axis of rotation of said head being substantially parallel to said bearing axis, and means for rotating said head.

9. In a machine of the class described, a tank having its bottom inclined to a horizontal and adapted to contain a liquid in the lower portion of its incline, a bearing disposed between opposite side portions of the tank and inwardly from its said lower portion with its axis substantially normal to the plane of incline of the tank bottom, an annular article carrier mounted for rotation around said bearing and to pass through said lower portion of the tank in submerged relation to a liquid therein and to pass therefrom to relatively elevated washing and take-off positions, and means *comprising a tool having a plurality of separated elongated flexible rubber rubbing elements* for buffing an article on said carrier when in said lower portion of the tank.

10. In a machine of the class described, a frame, an inclined bearing on said frame, a looped form of tank extending partially around said bearing in a plane substantially normal to its axis and having its loop at the lower side of the bearing and adapted to contain a liquid and to receive drainage from the adjacent more elevated portions of the tank, an annular table mounted for rotation on said bearing through the loop portion of said tank in substantially the plane of its incline and to washing and loading positions beyond the tank ends, means, projected into the lower portion of the tank to buff a registering article on the table, and means for driving said last means.

11. In a machine of the class described, a frame, an inclined bearing on said frame, a looped form of tank extending partially around said bearing concentric thereto and in a plane substantially normal to the bearing axis, said tank having its loop at the lower side of the bearing and adapted to contain a burnishing liquid and having portions extending upward on an incline from said loop portions to direct liquid drainage on said inclined portions down into said loop portion, said inclined portions having open ends elevated relative to said loop portion, a sump between said open ends, an annular table mounted for rotation on said bearing through the loop and inclined portions of the tank and the open ends of the latter in substantially the plane of said incline and over said sump and to a loading position between said ends, means projected into the lower portion of the tank to buff a registering article on the table, means for driving said last means, and means for directing a washing liquid on an article on the table when over said sump.

12. In an article burnishing machine, a member having a bottom and inner and outer side walls forming a tank of U-form with the tank bottom inclined to a horizontal and with the loop portion of the tank lowermost and with the leg portions inclining upwardly therefrom and open at their free ends, a bearing disposed between the legs of the tank and having its axis concentric to the loop portion of the tank and substantially normal to the plane of incline of the tank bottom, a table member having a centrally disposed portion mounted on the bearing and extending over the inner side wall of the tank and down into the tank with an article supporting rim portion at its outer edge adjacent to the tank bottom and substantially parallel therewith, said rim portion turning through the lower loop and side leg portions of the tank and through the open ends of said leg portions, means for wetting the articles carried by the rim during their passage through the loop portion of the tank, means projected into the lower loop portion of the tank to buff a registering article on said rim portion, means for driving said last means, and means for washing the articles after passing from an open end of the tank preparatory to removal from said rim.

*13. In a machine for burnishing non-planar surfaces of formed metal articles the combination of elements which comprises a tank for containing a burnishing liquid, a burnishing liquid in said tank, a conveyor, means to mount said conveyor in association with said tank whereby articles carried thereby are passed through the burnishing liquid in said tank, means to secure separate articles to said conveyor in spaced relation to each other, a burnishing head having a plurality of separated elongated flexible finger-like rubbing elements extending into said tank and immersed in said burnishing liquid in the path of articles carried by said conveyor, and power driven means to impart movement to the immersed portion of said burnishing head relative to an article carried by said conveyor and frictionally engaged by said burnishing head.*

*14. The combination of elements defined in claim 13 in which said conveyor comprises a rotatable table having an article carrying rim portion.*

*15. The method of burnishing non-planar surfaces of formed metal articles which comprises, securing the articles to a holding and supporting means, moving the supporting means and the articles held thereby to submerge them in a mixture of an abrasive suspended in a liquid, rotating a tool having a plurality of separated elongated flexible rubber rubbing elements beneath the surface of the liquid, bringing the surface of the articles to be burnished into frictional engagement with the free end portions of the rubbing elements in the presence of said mixture, and moving the burnished articles out of contact with the tool.*

*16. The method of burnishing non-planar surfaces of formed metal articles which comprises, holding the articles submerged in a mixture of abrasive suspended in a liquid, rotating a tool having a plurality of separated elongated flexible rubber rubbing elements beneath the surface of the liquid, bringing the surface of the articles to be burnished into frictional engagement with the free end portions of the rubbing elements in the presence of said mixture, and moving the burnished articles out of contact with the tool.*

*17. The method of burnishing non-planar surfaces of formed metal articles which comprises, holding the articles submerged in a mixture of abrasive suspended in a liquid, moving a tool having a plurality of separated elongated flexible rubbing elements at a speed sufficient to burnish said articles beneath the surface of the liquid, bringing the surface of the articles to be burnished into frictional engagement with the free end portions of the rubbing elements in the presence of said mixture, and moving the burnished articles out of contact with the tool.*

*18. The method of burnishing non-planar surfaces of formed metal articles which comprises, securing the articles to a holding and supporting means, moving the supporting means and the articles held thereby to submerge them in a mixture of an abrasive suspended in a liquid, rotating a tool having a plurality of separated elongated flexible rubber rubbing elements arranged with their end surfaces substantially in a plane normal to the axis of rotation of the tool beneath the surface of the liquid, bringing the surface of the article to be burnished into frictional engagement with the free end portions of the rubbing elements in the presence of said mixture, and moving the burnished articles out of contact with the tool.*

CLARENCE C. KINKER.
JAMES J. MURTAGH.

References Cited in the file of this patent or the original patent

UNITED STATES PATENTS

| Number | Name | Date |
|---|---|---|
| 425,897 | Morrison | Apr. 15, 1890 |
| 730,882 | Davis | June 16, 1903 |
| 796,016 | Robinson | Aug. 1, 1905 |
| 892,129 | Broderick | June 30, 1908 |
| 908,141 | Robinson | Dec. 29, 1908 |
| 1,077,336 | Dusha et al. | Nov. 4, 1913 |
| 1,125,751 | Smith | Jan. 19, 1915 |
| 1,134,944 | Boyle | Apr. 6, 1915 |
| 1,207,866 | Coppage | Dec. 12, 1916 |
| 1,262,529 | Lowe | Apr. 9, 1918 |
| 1,486,341 | Hoke | Mar. 11, 1924 |
| 1,526,267 | Dessau | Feb. 10, 1925 |
| 1,608,140 | Sheehan | Nov. 23, 1926 |
| 1,735,465 | Drake | Nov. 12, 1929 |
| 1,820,029 | Raule | Aug. 25, 1931 |
| 1,827,688 | Ley | Oct. 13, 1931 |
| 1,906,050 | Desenberg | Apr. 25, 1933 |
| 1,908,476 | Earl | May 9, 1933 |
| 1,925,599 | Oesterlein et al. | Sept. 5, 1933 |
| 1,978,674 | Johnson | Oct. 30, 1934 |
| 2,083,749 | Sword | June 15, 1937 |
| 2,110,441 | Kasch | Mar. 8, 1938 |
| 2,218,353 | Gruenberg | Oct. 15, 1940 |
| 2,248,953 | Bunch | July 15, 1941 |

FOREIGN PATENTS

| Number | Country | Date |
|---|---|---|
| 1,738 | Great Britain | Jan. 27, 1900 |
| 347,397 | Italy | Apr. 7, 1937 |